(12) United States Patent
Inoue

(10) Patent No.: US 10,642,549 B2
(45) Date of Patent: *May 5, 2020

(54) COMMUNICATION APPARATUS HAVING DIRECT WIRELESS COMMUNICATION FUNCTION AND METHOD FOR CONTROLLING COMMUNICATION APPARATUS

(71) Applicant: CANON KABUSHIKI KAISHA, Tokyo (JP)

(72) Inventor: Go Inoue, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/110,259

(22) Filed: Aug. 23, 2018

(65) Prior Publication Data

US 2018/0364959 A1 Dec. 20, 2018

Related U.S. Application Data

(63) Continuation of application No. 15/262,854, filed on Sep. 12, 2016, now Pat. No. 10,089,045.

(30) Foreign Application Priority Data

Sep. 17, 2015 (JP) ................. 2015-184526

(51) Int. Cl.
*G06F 3/12* (2006.01)
*G06K 15/02* (2006.01)
*H04W 84/12* (2009.01)
*H04W 52/02* (2009.01)

(52) U.S. Cl.
CPC ...... *G06F 3/1236* (2013.01); *H04W 52/0258* (2013.01); *G06F 3/1221* (2013.01); *G06F 3/1292* (2013.01); *H04W 84/12* (2013.01); *Y02D 10/1592* (2018.01); *Y02D 70/00* (2018.01); *Y02D 70/1222* (2018.01); *Y02D 70/142* (2018.01)

(58) Field of Classification Search
None
See application file for complete search history.

(56) References Cited

U.S. PATENT DOCUMENTS

| | | | | |
|---|---|---|---|---|
| 10,057,813 B1* | 8/2018 | Likar | ............... | H04W 12/06 |
| 10,089,045 B2* | 10/2018 | Inoue | ............... | G06F 3/1236 |
| 2006/0023651 A1* | 2/2006 | Tsuchiuchi | ......... | H04W 12/06 370/310 |
| 2012/0322391 A1* | 12/2012 | Suzuki | ............ | H04W 12/06 455/68 |
| 2013/0120597 A1* | 5/2013 | Sakai | ............. | H04N 5/23241 348/207.11 |

(Continued)

FOREIGN PATENT DOCUMENTS

CN 103944870 A 7/2014
EP 2717627 A2 4/2014

(Continued)

*Primary Examiner* — Beniyam Menberu
(74) *Attorney, Agent, or Firm* — Canon U.S.A., Inc., IP Division

(57) ABSTRACT

A communication apparatus including a direct wireless communication function determines whether the direct wireless communication function is automatically stopped based on a device setting and the type of an SSID to be used.

20 Claims, 8 Drawing Sheets

(56) References Cited

U.S. PATENT DOCUMENTS

| | | | |
|---|---|---|---|
| 2014/0022896 A1* | 1/2014 | Yeh | H04W 28/12 |
| | | | 370/230 |
| 2014/0176980 A1* | 6/2014 | Asai | H04W 4/80 |
| | | | 358/1.13 |
| 2014/0268222 A1 | 9/2014 | Inoue | |
| 2014/0269507 A1 | 9/2014 | Tanji | |
| 2014/0293331 A1* | 10/2014 | Asai | G06F 3/1286 |
| | | | 358/1.15 |
| 2014/0325085 A1 | 10/2014 | Moritomo | |
| 2014/0366101 A1* | 12/2014 | Murata | H04N 1/00127 |
| | | | 726/4 |
| 2015/0296554 A1* | 10/2015 | Okazaki | H04W 76/14 |
| | | | 455/418 |
| 2016/0299725 A1* | 10/2016 | Hosoda | H04W 12/08 |
| 2017/0041860 A1* | 2/2017 | Ogawa | H04W 48/16 |
| 2017/0041977 A1* | 2/2017 | Yokoyama | H04L 63/083 |
| 2018/0352591 A1* | 12/2018 | Maki | H04W 76/34 |

FOREIGN PATENT DOCUMENTS

| | | |
|---|---|---|
| JP | 2015-070557 A | 4/2015 |
| JP | 2015-130637 A | 7/2015 |
| KR | 10-2014-0054175 A | 5/2014 |
| KR | 10-2015-0098654 A | 8/2015 |
| WO | 2013/136876 A1 | 9/2013 |

\* cited by examiner

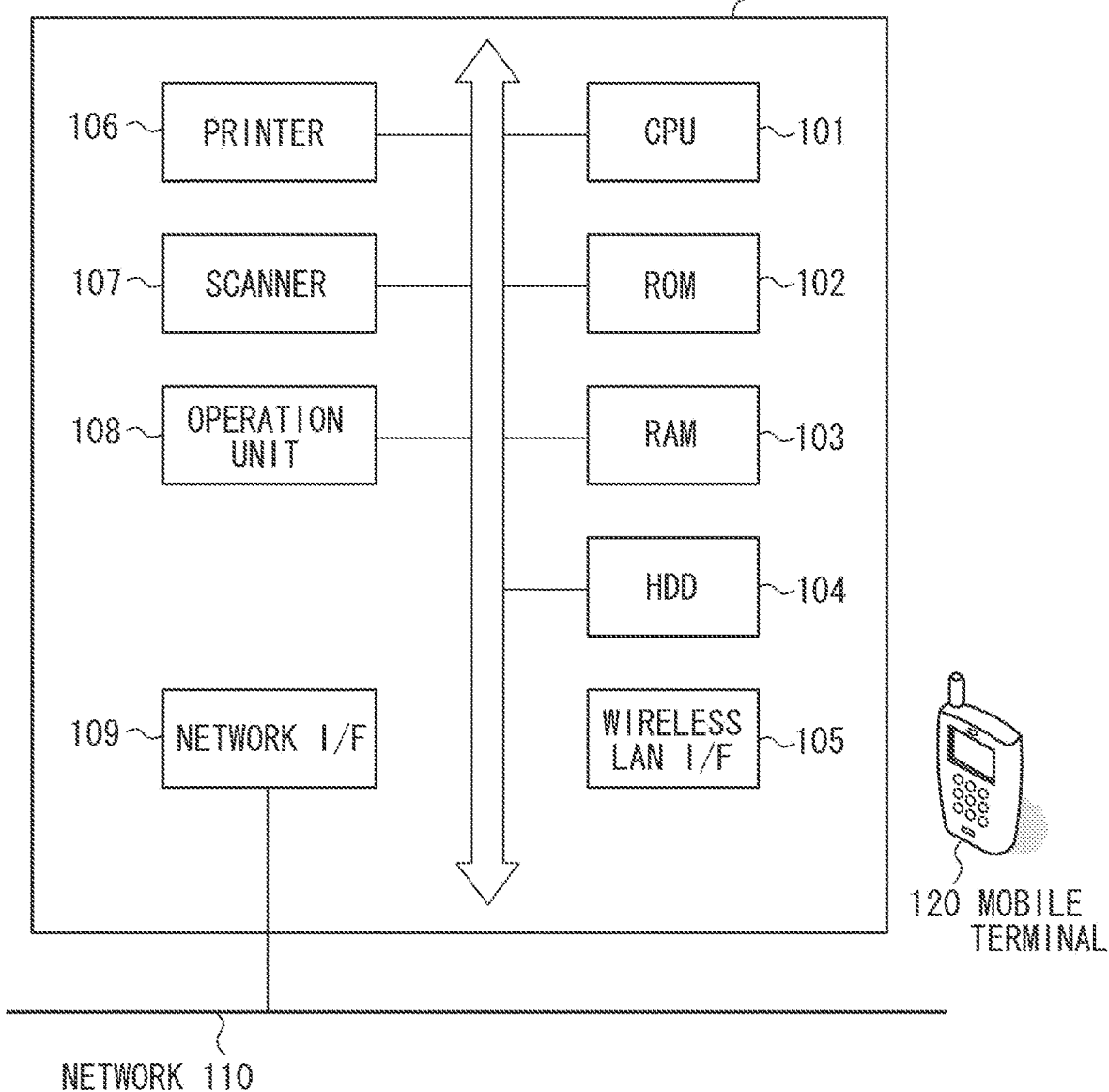

MENU SCREEN 200

WIRELESS CONNECTION SCREEN 210

WIRELESS CONNECTION SCREEN 220

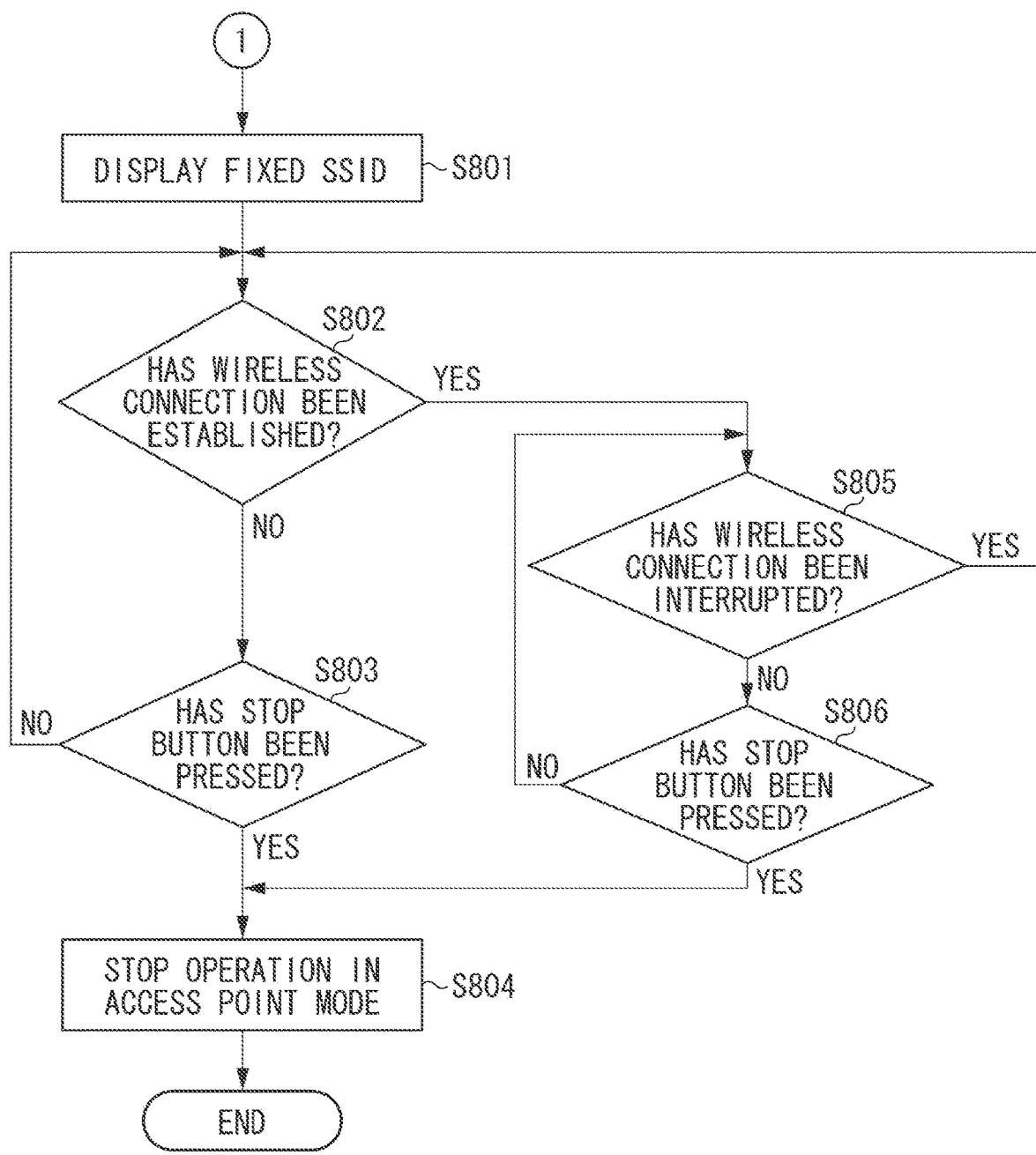

COMMUNICATION APPARATUS HAVING DIRECT WIRELESS COMMUNICATION FUNCTION AND METHOD FOR CONTROLLING COMMUNICATION APPARATUS

CROSS REFERENCE TO RELATED APPLICATIONS

The present application is a continuation of U.S. patent application Ser. No. 15/262,854, filed on Sep. 12, 2016, which claims priority from Japanese Patent Application No. 2015-184526 filed Sep. 17, 2015, which is hereby incorporated by reference herein in its entirety.

BACKGROUND

Field

Aspects of the present invention generally relate to a communication apparatus including a direct wireless communication function.

Description of the Related Art

More and more various communication apparatuses, such as personal computers (PCs), smartphones, game machines, and printing apparatuses, have been including a wireless local area network (LAN) function. These communication apparatuses wirelessly connect to an external access point and perform wireless communication with other devices via the access point. For example, a printing apparatus receives print data transmitted by a PC or a smartphone via an access point, and then performs print processing based on the received print data.

Some of the communication apparatuses themselves operate as a software access point, thereby performing direct wireless communication with other devices without a relay apparatus such as an access point. A wireless communication method of performing direct wireless communication with other devices without a relay apparatus such as an access point is referred to as a direct wireless communication mode. Specific examples of the direct wireless communication mode include Wi-Fi Direct® and an access point mode.

Japanese Patent Application Laid-Open No. 2014-179926 discusses a configuration in which a printing apparatus operates in a direct wireless communication mode (Wi-Fi Direct®), and receives print data from a mobile terminal to perform print processing. Japanese Patent Application Laid-Open No. 2014-179926 also discusses a configuration in which the printing apparatus ends the operation of the communication apparatus in the direct wireless communication mode when the print processing completes and when the printing apparatus shifts to a power saving state.

If a user wants the communication apparatus to use the direct wireless communication mode, the user inputs an instruction to the communication apparatus to start operating in the direct wireless communication mode. The communication apparatus starts operating in the direct wireless communication mode in response to the instruction and establishes a wireless connection with other devices.

Conventional communication apparatuses automatically stop operating in the direct wireless communication mode when wireless connections are not established between the communication apparatuses and other devices for a predetermined period of time after the communication apparatuses start to operate in the direct wireless communication mode. In this way, the conventional communication apparatuses prevent an increase in power consumption when the communication apparatuses operate in the direct wireless communication mode.

SUMMARY

According to an aspect of the present invention, a communication apparatus including a direct wireless communication function includes a setting unit configured to set a first setting for automatically stopping the direct wireless communication function or a second setting for not automatically stopping the direct wireless communication function, and a control unit configured to, in a case where the setting unit sets the first setting, stop the direct wireless communication function on a condition that a predetermined period of time has elapsed while a wireless connection using the direct wireless communication function is not established and, in a case where the setting unit sets the second setting, not stop the direct wireless communication function even if the predetermined period of time has elapsed while the wireless connection is not established.

Further features of aspects of the present invention will become apparent from the following description of exemplary embodiments with reference to the attached drawings.

BRIEF DESCRIPTION OF THE DRAWINGS

FIG. 1 is a block diagram illustrating a hardware configuration of a printing apparatus.

FIG. 8 is a flowchart illustrating the processing relating to the operation in the access point mode.

DESCRIPTION OF THE EMBODIMENTS

Figure 2A:
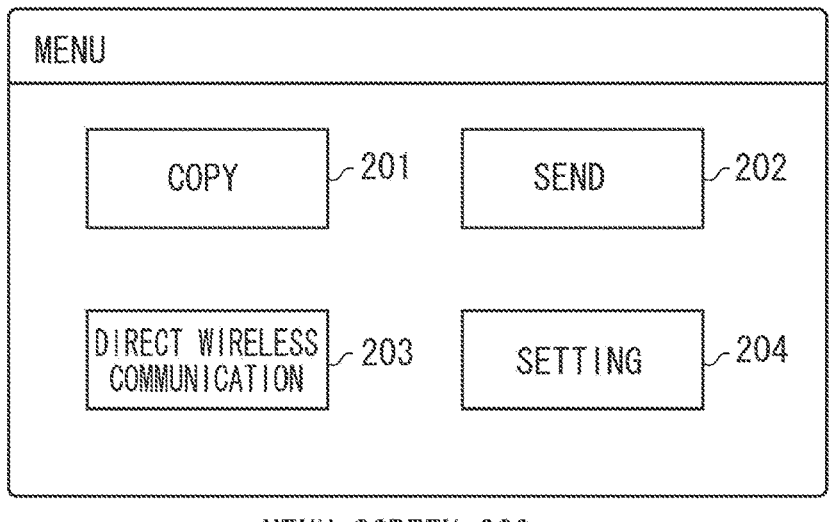
FIGS. 2A, 2B, and 2C are diagrams illustrating a procedure for using an access point mode.

Exemplary embodiments of the present invention will be described below with reference to the drawings. The following exemplary embodiments are not intended to limit the aspects of the invention according to the scope of claims, and all combinations of features described in the exemplary embodiments are not necessarily essential to implement the aspects of the invention.

A first exemplary embodiment will be described below. First, an entire image of a communication system and a hardware configuration of a printing apparatus 100 will be described with reference to FIG. 1. The printing apparatus 100 is connected to a network 110. The printing apparatus 100 receives print data from an external apparatus, such as a PC on the network 110, and performs print processing based on the received print data.

The printing apparatus 100 performs wireless communication with a portable terminal 120. The printing apparatus 100 can perform two systems of wireless communication. The first system is a system for the printing apparatus 100 to perform wireless communication with the portable terminal 120 via an external access point by being connected to the external access point. This system is referred to as an infrastructure mode. The second system is a system for the printing apparatus 100 to perform direct wireless communication with the portable terminal 120 without a relay apparatus, such as an access point, by operating as a software access point. The system for the printing apparatus 100 and the portable terminal 120 to perform direct wireless communication without a relay apparatus is referred to as a direct wireless communication mode. The printing apparatus 100 operates in either the infrastructure mode or the direct wireless communication mode to receive print data from the portable terminal 120 using wireless communication. The printing apparatus 100 performs print processing based on the received print data.

The hardware configuration of the printing apparatus 100 will be described below. The printing apparatus 100 is an example of a communication apparatus that performs wireless communication in the infrastructure mode or the direct wireless communication mode. Other devices that can perform wireless communication in the infrastructure or direct wireless communication modes can be applied to the present exemplary embodiment.

The CPU 101 performs various types of processing for reading out a control program stored in the ROM 102 to control an operation of the printing apparatus 100. A read-only memory (ROM) 102 stores the control program. A random access memory (RAM) 103 is used as a temporary storage area, such as a main memory or a work area in the CPU 101. A hard disk drive (HDD) 104 is a nonvolatile storage medium storing various types of data.

In the present exemplary embodiment, the CPU 101 performs each of the processes illustrated in the flowcharts described below, in the printing apparatus 100. In another exemplary embodiment, a plurality of CPUs performs each of the processes illustrated in the flowcharts in cooperation with one another. Some of the processes in the flowcharts, described below, can also be performed using a hardware circuit, such as an Application Specific Integrated Circuit (ASIC).

A wireless LAN interface (I/F) 105 performs wireless communication based on Wi-Fi® with the external apparatus (e.g., the portable terminal 120). The wireless LAN I/F 105 is operable in the infrastructure mode for the printing apparatus 100 to perform wireless communication with the external apparatus by being connected to the external access point. It is operable in the direct wireless communication mode for the printing apparatus 100 to perform direct wireless communication with the external apparatus without the relay apparatus, such as the access point. In the present exemplary embodiment, as a specific example of the direct wireless communication mode, the printing apparatus 100 operates in the access point mode. However, the direct wireless communication mode of the present exemplary embodiment is not limited to the access point mode. Wi-Fi Direct® is also applicable as the direct wireless communication mode.

A network I/F 109 is connected to the network 110 via a LAN cable. The network I/F 109 is communicable with the external apparatus (e.g., the PC) on the network 110.

A printer 106 performs print processing on a sheet based on print data received by the wireless LAN I/F 105 or the network I/F 109. A scanner 107 reads a document to generate a document image. The document image, which has been generated by the scanner 107, is printed by the printer 106 (i.e., copy processing), and is stored in the HDD 104.

An operation unit 108 includes a liquid crystal display unit including a touch panel function and a keyboard, and displays various types of operation screens. A user can input instructions and information to the printing apparatus 100 via the operation unit 108.

A procedure for an operation performed when the user uses the access point mode will be described below with reference to FIG. 2. If the user uses the access point mode, the user instructs the printing apparatus 100 to start an operation in the access point mode.

Figure 2B:
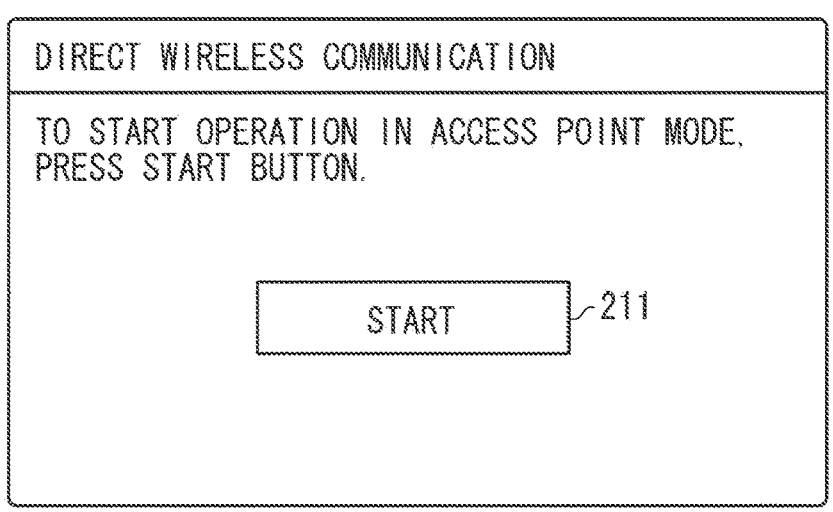
Figure 2C:
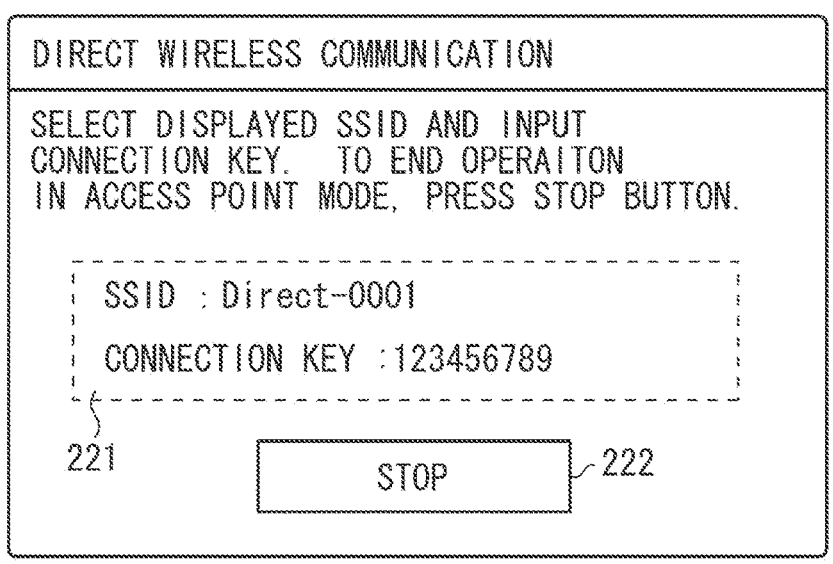

A menu screen 200 illustrated in FIG. 2A is a screen displayed by the operation unit 108, and is an initial screen displayed when the printing apparatus 100 is started. In the case where user authentication is needed to access the printing apparatus 100, the initial screen is typically displayed after successful user authentication. Functions of the printing apparatus 100, which are usable by the user, are displayed on the menu screen 200, and the user can select and use the desired function.

A button 201 is a button for the user to use a copy function. When the user touches the button 201, the operation unit 108 displays a copy screen (not illustrated).

A button 202 is a button for the user to use a SEND function, which transmits a document image generated by the scanner 107 to the external apparatus. When the user touches the button 202, the operation unit 108 displays a SEND screen (not illustrated).

A button 204 is a button for performing a device setting of the printing apparatus 100. When the user touches the button 204, the operation unit 108 displays various types of setting screens. A setting screen 300 illustrated in FIG. 3, described below, is also included in the various types of setting screens.

A button 203 is a button for the user to use the access point mode. When the user touches the button 203, the operation unit 108 displays a wireless connection screen 210 illustrated in FIG. 2B.

A start button 211 is displayed on the wireless connection screen 210. The start button 211 is a button for the user to instruct the printing apparatus 100 to start the operation in the access point mode. When the user touches the start button 211, the printing apparatus 100 starts the operation in the access point mode, and the operation unit 108 displays a wireless connection screen 220 illustrated in FIG. 2C.

When the printing apparatus 100 operates in the access point mode, the printing apparatus 100 creates a Service Set Identifier (SSID), and functions as a software access point. A connection key, e.g., a Wired Equivalent Privacy (WEP) key and the SSID created by the printing apparatus 100 are displayed in an area 221 in the wireless connection screen 220. The SSID includes two types of SSIDs, i.e., a fixed SSID and a one-time SSID. The user, who has confirmed content displayed in the area 221, uses the user's own portable terminal (e.g., the portable terminal 120) to search for an access point in proximity to the user's location, and selects the SSID displayed in the area 221 from a list of search results. When the user inputs the connection key displayed in the area 221 into the portable terminal 120, wireless communication is established between the printing apparatus 100 and the user's portable terminal.

A stop button 222 is displayed on the wireless connection screen 220. When the user wants to stop the printing apparatus 100 from operating in the access point mode, the user touches the stop button 222. While the printing apparatus 100 is operating in the access point mode, the power consumption of the printing apparatus 100 increases. Thus, the user is able to conserve power consumption by touching the stop button 222 when the need to use the access point mode ends.

A procedure for the operation performed when the user uses the access point mode has been described above with reference to FIG. 2. When the user touches the start button 211, the printing apparatus 100 starts the operation in the access point mode by entering a standby state where it waits for a wireless connection request to be issued from the external apparatus. The wireless connection request is not necessarily immediately issued from the external apparatus after the printing apparatus 100 starts the operation in the access point mode. Therefore, the operation in the access point mode can stop if a predetermined period of time has elapsed without receipt of a wireless connection request since the operation in the access point mode was started. Thus, power consumption can be prevented from uselessly increasing in the printing apparatus 100.

The operation in the access point mode may not be automatically stopped depending on the access point mode and use of the printing apparatus 100. For example, if multiple users use the direct wireless communication mode, like in an office environment, the operation in the direct wireless communication mode is typically continued. In the present exemplary embodiment, determination whether the operation in the access point mode is automatically stopped when the wireless connection request has not been received within a predetermined time period is switched by the device setting of the printing apparatus 100.

Figure 3:
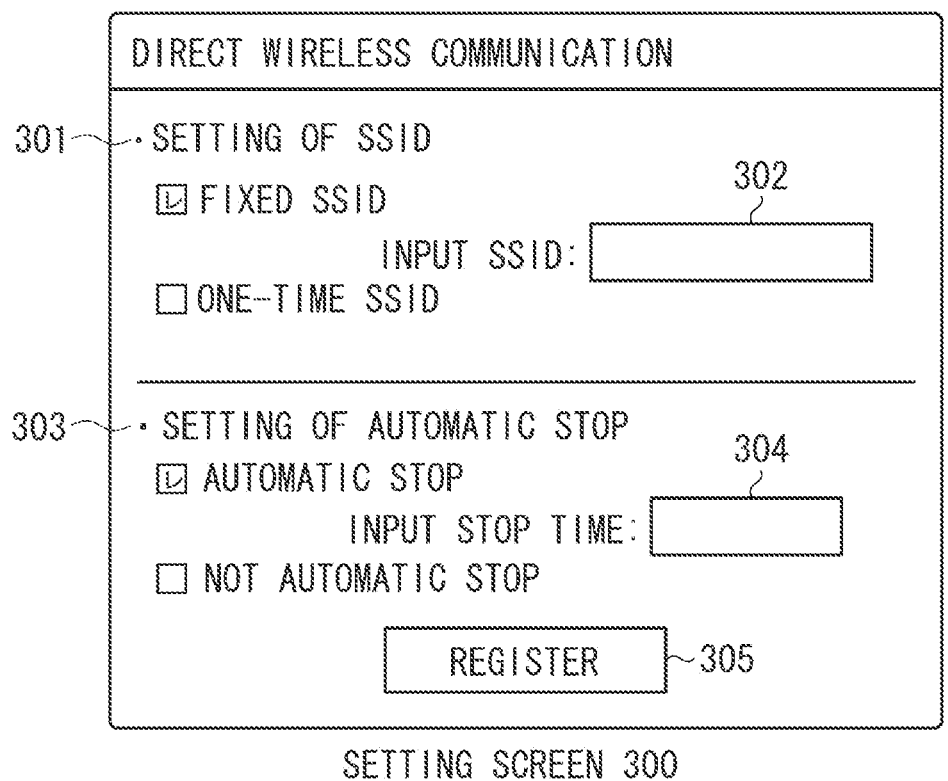
FIG. 3 is a diagram illustrating a setting screen relating to the access point mode.

A method for switching whether the operation in the access point mode is automatically stopped will now be described. A setting screen 300 illustrated in FIG. 3 is a screen for the user to make a setting relating to the access point mode, and is displayed by the operation unit 108. In the setting screen 300, the user can set which of the fixed SSID and the one-time SSID is used as the SSID and whether the operation in the access point mode is automatically stopped.

In an item 301, the user selects either the fixed SSID or the one-time SSID to use as the SSID. The setting screen 300 reflects a case where the user selected the fixed SSID. The fixed SSID is an SSID that the user has input into an input area 302. If the fixed SSID is used as the SSID, the SSID used in the access point mode becomes an SSID that is the same every time, i.e., the SSID that the user has input into the input area 302. A fixed SSID is useful in a situation where many and/or unspecified persons use the access point mode in an infrastructure connection environment.

The one-time SSID is an SSID that is randomly created. If the one-time SSID is used as the SSID, a random SSID is created every time the operation in the access point mode is started. The one-time SSID is selected for situations where the access point mode is used temporarily.

In an item 303, the user selects whether the operation in the access point mode is automatically stopped. The setting screen 300 indicates a case where the user has selected "automatic stop". When the "automatic stop" is selected, the printing apparatus 100 automatically stops the operation in the access point mode on the condition that a wireless connection has not been established for a predetermined period of time since the operation in the access point mode was started. "Predetermined period of time" is a period of time that the user has input into the input area 304. "Predetermined period of time=0" means that the operation in the access point mode is not performed. Therefore, a lower-limit value of a period of time, which is settable as the "predetermined period of time", e.g., "one minute or more" is typically set. When "not automatic stop" is selected in the item 303, the printing apparatus 100 does not stop the operation in the access point mode even if the wireless connection has not been established since the operation in the access point mode was started. The item 303 enables the user to set whether the operation in the access point mode is automatically stopped in consideration of the access point mode and how to use of the printing apparatus 100.

The user, who has made desired settings in the items 301 and 303, touches a registration button 305. When the user touches the registration button 305, the printing apparatus 100 stores a setting result by the setting screen 300 as a device setting in the HDD 104.

Processing for starting the operation in the access point mode and processing for automatically stopping the operation in the access point mode will be described below with reference to flowcharts in FIGS. 4 and 5. Each of steps illustrated in the flowcharts of FIGS. 4 and 5 is processed by the CPU 101 loading a control program stored in the memory, such as the ROM 102, and executing the loaded control program.

Figure 4:
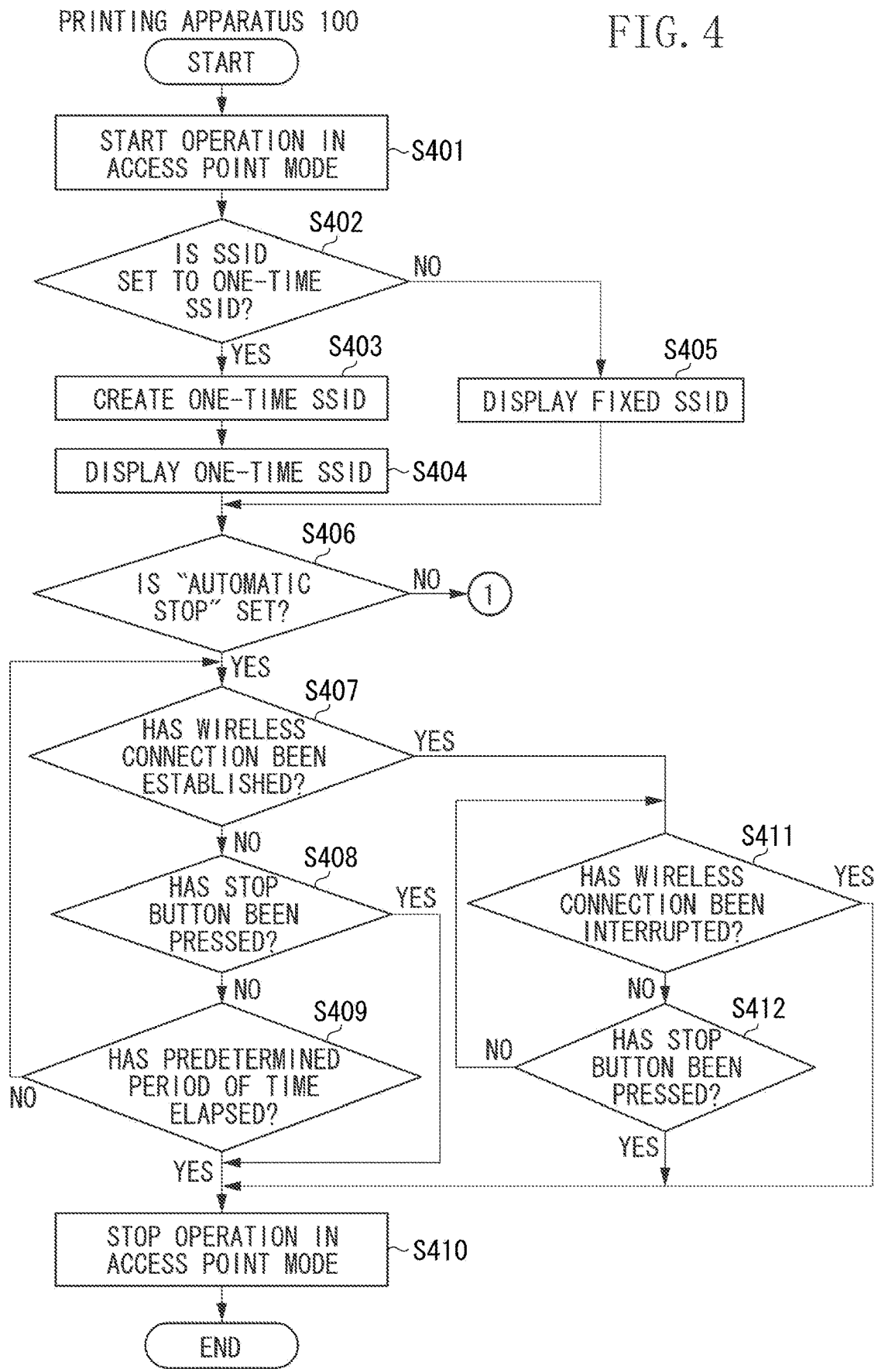
FIG. 4 is a flowchart illustrating processing relating to an operation in the access point mode.
Figure 5:
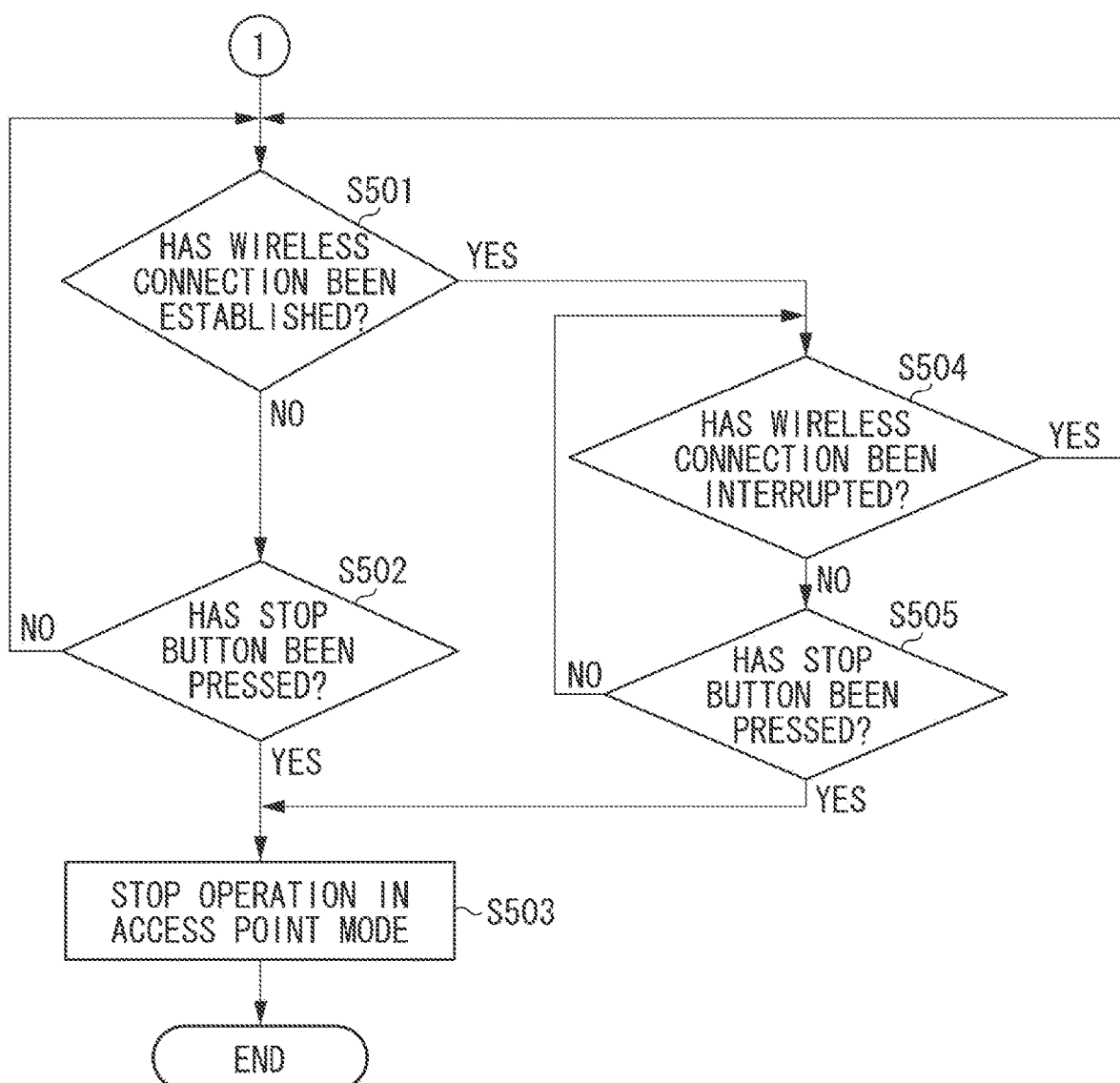
FIG. 5 is a flowchart illustrating the processing relating to the operation in the access point mode.

When the user touches the start button 211 on the wireless connection screen 210, the processing illustrated in the flowchart of FIG. 4 is performed. First, in step S401, the CPU 101 starts the operation in the access point mode. More specifically, the CPU 101 instructs the wireless LAN I/F 105 to start the operation in the access point mode. The CPU 101 starts a timer at when the operation in the access point mode starts.

In step S402, the CPU 101 confirms whether the SSID is set to the one-time SSID. The process in step S402 is performed by confirming the device setting stored in the HDD 104, i.e., the result of the setting made via the setting screen 300. If the SSID is set to the one-time SSID (YES in step S402), the processing proceeds to step S403. If the SSID is set to the fixed SSID (NO in step S402), the processing proceeds to step S405.

Next, in step S403, the CPU 101 randomly creates the one-time SSID. In step S404, the CPU 101 then displays the created one-time SSID. More specifically, the CPU 101 controls the operation unit 108 to display a wireless connection screen indicating the created SSID (e.g., the wireless connection screen 220), and the operation unit 108 displays the wireless connection screen.

In step S405, the CPU 101 displays the fixed SSID. More specifically, the CPU 101 controls the operation unit 108 to display a wireless connection screen indicating the fixed SSID (e.g., the wireless connection screen 220), and the operation unit 108 displays the wireless connection screen. The fixed SSID is an SSID input by the user into the input area 302 in the setting screen 300.

Next, in step S406, the CPU 101 determines whether the device setting of the printing apparatus 100 is a setting for automatically stopping the operation in the access point mode, i.e., whether "automatic stop" is set. The process in step S406 is performed by confirming the device setting stored in the HDD 104, i.e., the result of the setting made via the setting screen 300. If the "automatic stop" is set in the setting screen 300 (YES in step S406), the processing proceeds to step S407. If the "not automatic stop" is set in the setting screen 300 (NO in step S406), the processing proceeds to step S501 illustrated in FIG. 5.

In step S407, the CPU 101 determines whether the wireless connection using the access point mode has been established between the external apparatus and the printing apparatus 100. If the wireless connection using the access point mode has been established between the external apparatus and the printing apparatus 100 (YES in step S407), the processing proceeds to step S411. If the wireless connection using the access point mode has not been established between the external apparatus and the printing apparatus 100 (NO in step S407), the processing proceeds to step S408.

In step S408, the CPU 101 determines whether the stop button 222 for issuing the instruction to stop the operation in the access point mode has been pressed. If the user has touched the stop button 222 on the wireless connection screen 220, the CPU 101 determines that the stop button 222 has been pressed (YES in step S408), and the processing proceeds to step S410. If the user has not touched the stop button 222, the CPU 101 determines that the stop button 222 has not been pressed (NO in step S408), and the processing proceeds to step S409.

Next, in step S409, the CPU 101 determines whether a predetermined period of time has elapsed since the operation in the access point mode was started. As described above, in the present exemplary embodiment, the CPU 101 starts the timer when the operation in the access point mode starts in step S401. The "predetermined period of time" herein described is a period of time input by the user into the input area 304 in the setting screen 300. If the predetermined period of time has elapsed while the wireless connection using the access point mode is not established since the operation in the access point mode was started (YES in step S409), the processing proceeds to step S410. If the predetermined period of time has not elapsed (NO in step S409), the processing returns to step S407.

In step S410, the CPU 101 stops the operation in the access point mode. More specifically, the CPU 101 instructs the wireless LAN I/F 105 to stop the operation in the access point mode.

In step S411, the CPU 101 determines whether the wireless connection using the access point mode has been interrupted. If the wireless connection using the access point mode has been interrupted (YES in step S411), the processing proceeds to step S410. In step S410, the CPU 101 stops the operation in the access point mode. If the wireless connection using the access point mode has not been interrupted (NO in step S411), the processing proceeds to step S412. In another exemplary embodiment, a plurality of wireless connections using the access point mode can be established in parallel. If the plurality of wireless connections is established in parallel, when all of the plurality of wireless connections has been interrupted, it is determined that the plurality of wireless connections using the access point mode has been interrupted (YES in step S411).

In step S412, the CPU 101 determines whether the stop button 222 for issuing the instruction to stop the operation in the access point mode has been pressed. If the user has touched the stop button 222 on the wireless connection screen 220, the CPU 101 determines that the stop button 222 has been pressed (YES in step S412), and the processing proceeds to step S410. In step S410, the CPU 101 stops the operation in the access point mode. If the user has not touched the stop button 222, the CPU 101 determines that the stop button 222 has not been pressed (NO in step S412), and the processing returns to step S411.

Next, processing performed when the "not automatic stop" is set in the setting screen 300 (NO in step S406), i.e., the printing apparatus 100 is set not to automatically stop the operation in the access point mode will be described with reference to FIG. 5. In step S501, the CPU 101 determines whether the wireless connection using the access point mode has been established between the external apparatus and the printing apparatus 100. If the wireless connection using the access point mode has been established between the external apparatus and the printing apparatus 100 (YES in step S501), the processing proceeds to step S504. If the wireless connection using the access point mode has not been established between the external apparatus and the printing apparatus 100 (NO in step S501), the processing proceeds to step S502.

In step S502, the CPU 101 determines whether the stop button 222 for issuing the instruction to stop the operation in the access point mode has been pressed. If the user has touched the stop button 222 on the wireless connection screen 220, the CPU 101 determines that the stop button 222 has been pressed (YES in step S502), and the processing proceeds to step S503. If the user has not touched the stop button 222, the CPU 101 determines that the stop button 222 has not been pressed (NO in step S502), and the processing returns to step S501.

In step S503, the CPU 101 stops the operation in the access point mode. More specifically, the CPU 101 instructs the wireless LAN I/F 105 to stop the operation in the access point mode.

Next, in step S504, the CPU 101 determines whether the wireless connection using the access point mode has been interrupted. If the wireless connection using the access point mode has been interrupted (YES in step S504), the processing returns to step S501. If the wireless connection using the access point mode has not been interrupted (NO in step S504), the processing proceeds to step S505. In another exemplary embodiment, a plurality of wireless connections using the access point mode can be established in parallel. If the plurality of wireless connections is established in parallel, when all of the plurality of wireless connections have been interrupted, it is determined that the plurality of wireless connections using the access point mode have been interrupted (YES in step S504). If the printing apparatus 100 is set not to automatically stop the operation in the access point mode, even if the wireless connection using the access point mode is interrupted, the operation in the access point mode is not automatically stopped.

In step S505, the CPU 101 determines whether the stop button 222 for issuing the instruction to stop the operation in the access point mode has been pressed. If the user has touched the stop button 222 on the wireless connection screen 220, the CPU 101 determines that the stop button 222 has been pressed (YES in step S505), and the processing proceeds to step S503. In step S503, the CPU 101 stops the operation in the access point mode. If the user has not touched the stop button 222, the CPU 101 determines that the stop button 222 has not been pressed (NO in step S505), and the processing returns to step S504.

As described above, in the present exemplary embodiment, if the wireless connection using the access point mode has not been established since the operation in the access point mode was started, it is determined whether the operation in the access point mode is automatically stopped based on the device setting.

If the "automatic stop" is set as the device setting, the printing apparatus 100 automatically stops the operation in the access point mode on the condition that the wireless connection has not been established for a predetermined period of time since the operation in the access point mode was started. Thus, when the printing apparatus 100 continues to perform the operation in the access point mode regardless of whether the wireless connection has not been established, unnecessary increase in power consumption can be prevented.

If the "not automatic stop" is set as the device setting, the printing apparatus 100 does not automatically stop the operation in the access point mode even if the wireless connection has not been established for a predetermined period of time since the operation in the access point mode was started. If the wireless connection is expected to be established some time since the operation in the access point mode was started, when the printing apparatus 100 continues to perform the operation in the access point mode, time and labor required by the user can be reduced.

The printing apparatus 100 stops the operation in the access point mode when it receives a stop instruction from the user (when the stop button 222 has been pressed) regardless of whether the device setting is the "automatic stop" or the "not automatic stop".

A second exemplary embodiment will now be described. The first exemplary embodiment described a configuration where whether to automatically stop the operation in the access point mode is switched is based on the device setting. The present exemplary embodiment will describe a configuration where whether to automatically stop an operation in an access point mode is switched based on the type of an SSID. A hardware configuration of a printing apparatus 100 according to the present exemplary embodiment is similar to that in the first exemplary embodiment, and thus a detailed description will be omitted.

Figure 6:
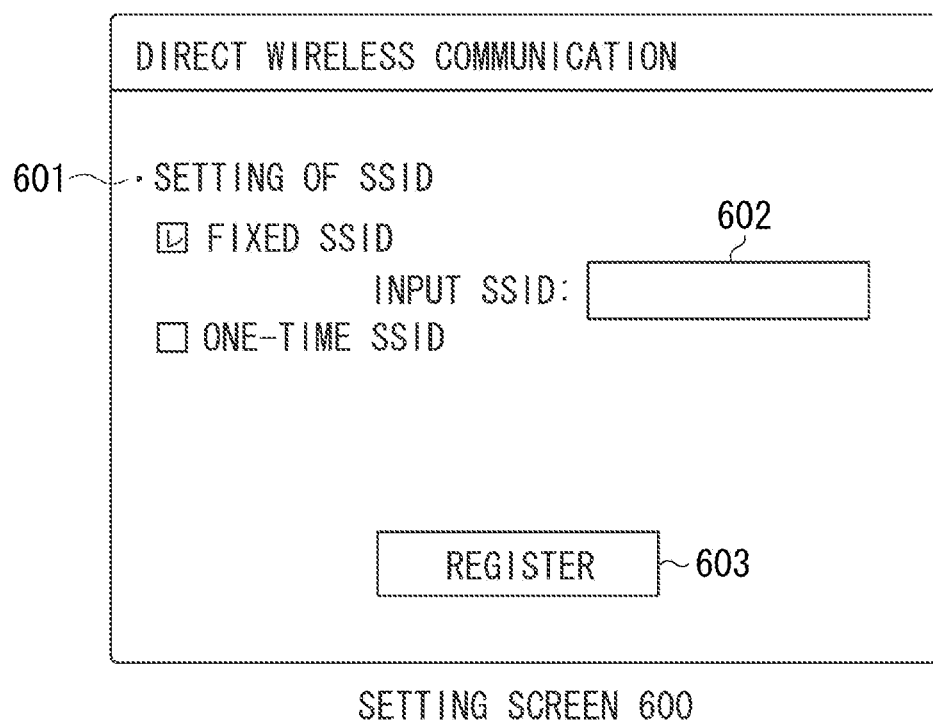
FIG. 6 is a diagram illustrating a setting screen relating to the access point mode.

A setting screen 600 illustrated in FIG. 6 is a screen for a user to make a setting relating to an access point mode, and is displayed by an operation unit 108.

In an item 601, a user selects which of a fixed SSID and a one-time SSID is used as the SSID. The setting screen 600 indicates a case where the user has selected the fixed SSID. The fixed SSID is an SSID input by the user into an input area 602. If the fixed SSID is used as the SSID, the SSID used in the access point mode becomes the same SSID every time. If the one-time SSID is used as the SSID, a random SSID is created every time an operation in the access point mode is started. When the user touches a registration button 603, the printing apparatus 100 stores a setting result by the setting screen 600 as a device setting in a HDD 104.

In the present exemplary embodiment, whether to automatically stop the operation in the access point mode is switched based on the type of the SSID. More specifically, if the one-time SSID is used, the operation in the access point mode is automatically stopped. The one-time SSID is assumed to be used for the purpose of temporarily using the access point mode and the printing apparatus 100.

If the fixed SSID is used, the operation in the access point mode is not automatically stopped. The fixed SSID is assumed to be used more for the purpose of using the access point mode in an infrastructure connection by many and/or unspecified persons, like in an office environment. This type of environment lends itself more to the operation in the access point not automatically stopping, but continuing.

Processing for starting the operation in the access point mode and processing for automatically stopping the operation in the access point mode will be described below with reference to the flowcharts in FIGS. 7 and 8. Each of steps illustrated in the flowcharts of FIGS. 7 and 8 is processed by a CPU 101 loading a control program stored in a memory such as a ROM 102 into a RAM 103 and executing the loaded control program.

Figure 7:
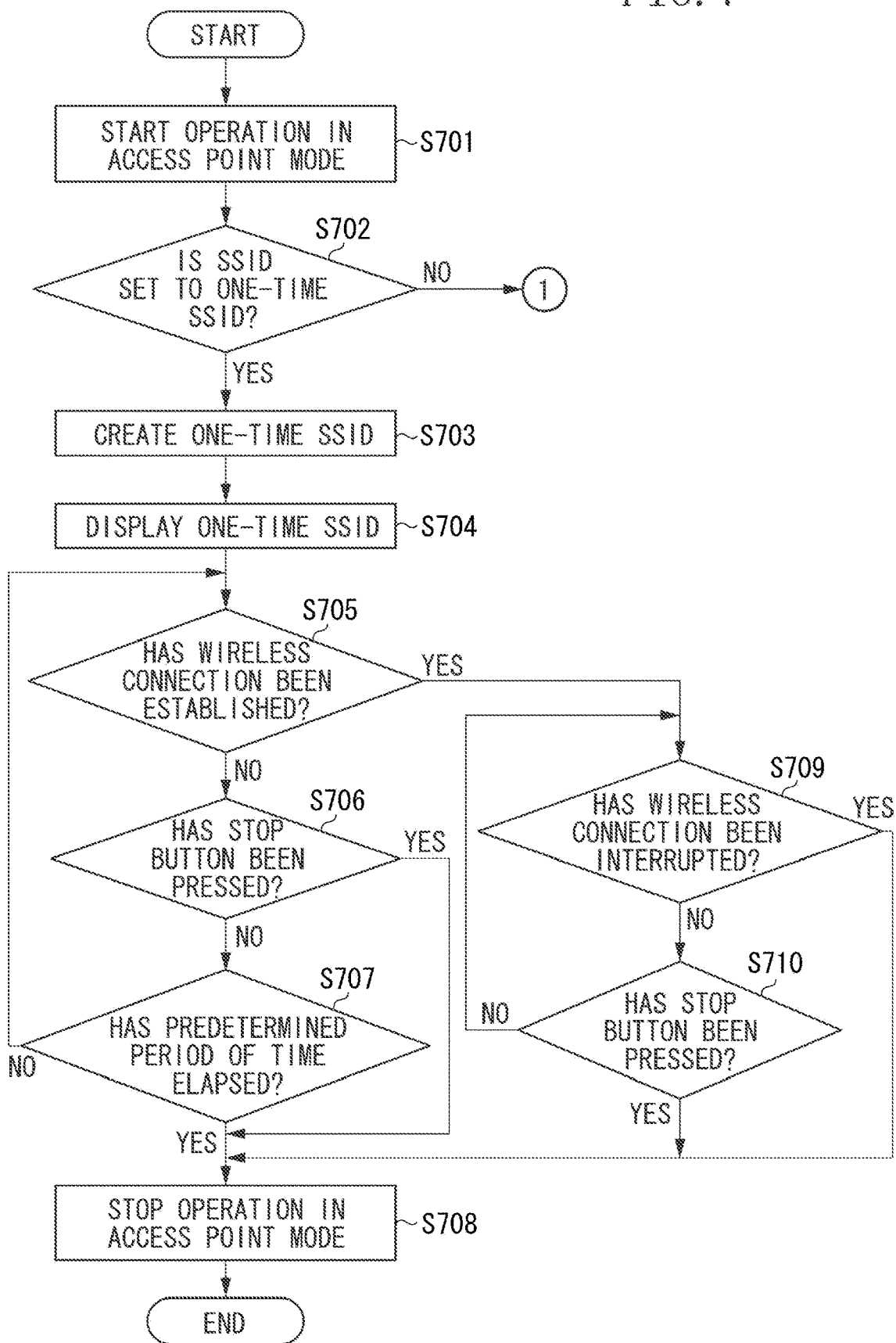
FIG. 7 is a flowchart illustrating processing relating to an operation in the access point mode.

When the user touches a start button 211 on a wireless connection screen 210, the processing illustrated in the flowchart of FIG. 7 is performed. First, in step S701, the CPU 101 starts the operation in the access point mode. More specifically, the CPU 101 instructs a wireless LAN I/F 105 to start the operation in the access point mode. The CPU 101 starts a timer when the operation in the access point mode starts.

In step S702, the CPU 101 confirms whether the SSID is set to the one-time SSID. The process in step S702 is performed by confirming the device setting stored in the HDD 104, i.e., the result of the setting made via the setting screen 600. If the SSID is set to the one-time SSID (YES in step S702), the processing proceeds to step S703. If the SSID is set to the fixed SSID (NO in step S702), the processing proceeds to step S801 illustrated in FIG. 8.

Next, in step S703, the CPU 101 randomly creates the one-time SSID. In step S704, the CPU 101 displays the created one-time SSID. More specifically, the CPU 101 controls the operation unit 108 to display a wireless connection screen indicating the created SSID (e.g., a wireless connection screen 220), and the operation unit 108 displays the wireless connection screen.

In step S705, the CPU 101 determines whether the wireless connection using the access point mode has been established between an external apparatus and the printing apparatus 100. If the wireless connection using the access point mode has been established between the external apparatus and the printing apparatus 100 (YES in step S705), the processing proceeds to step S709. If the wireless connection using the access point mode has not been established between the external apparatus and the printing apparatus 100 (NO in step S705), the processing proceeds to step S706.

In step S706, the CPU 101 determines whether a stop button 222 for issuing an instruction to stop the operation in the access point mode has been pressed. If the user has touched the stop button 222 on the wireless connection screen 220, the CPU 101 determines that the stop button 222 has been pressed (YES in step S706), and the processing proceeds to step S708. If the user has not touched the stop button 222, the CPU 101 determines that the stop button 222 has not been pressed (NO in step S706), and the processing proceeds to step S707.

In step S707, the CPU 101 determines whether a predetermined period of time has elapsed since the operation in the access point mode was started. As described above, in the present exemplary embodiment, the CPU 101 starts the timer when the operation in the access point mode starts in step S701. The "predetermined period of time" herein described is assumed to be a period of time (e.g., five minutes) previously set in the printing apparatus 100. This period of time is changeable by the user. If the predetermined period of time has elapsed while the wireless connection using the access point mode is not established since the operation in the access point mode was started (YES in step S707), the processing proceeds to step S708. If the predetermined period of time has not elapsed (NO in step S707), the processing returns to step S705.

In step S708, the CPU 101 stops the operation in the access point mode. More specifically, the CPU 101 instructs the wireless LAN I/F 105 to stop the operation in the access point mode.

Next, in step S709, the CPU 101 determines whether the wireless connection using the access point mode has been interrupted. If the wireless connection using the access point mode has been interrupted (YES in step S709), the processing proceeds to step S708. In step S708, the operation in the access point mode is stopped. If the wireless connection using the access point mode has not been interrupted (NO in step S709), the processing proceeds to step S710. In another exemplary embodiment, a plurality of wireless connections using the access point mode can be established in parallel. If the plurality of wireless connections is established in parallel, when all of the plurality of wireless connections has been interrupted, it is determined that the plurality of wireless connections using the access point mode has been interrupted (YES in step S709).

In step S710, the CPU 101 determines whether the stop button 222 for issuing the instruction to stop the operation in the access point mode has been pressed. If the user has touched the stop button 222 on the wireless connection screen 220, the CPU 101 determines that the stop button 222 has been pressed (YES in step S710), and the processing proceeds to step S708. In step S708, the CPU 101 stops the operation in the access point mode. If the user has not touched the stop button 222, the CPU 101 determines that the stop button 222 has not been pressed (NO in step S710), and the processing returns to step S709.

Next, processing performed when the SSID to be used is set to the fixed SSID will be described with reference to FIG. 8. In step S801, the CPU 101 displays the fixed SSID. More specifically, the CPU 101 controls the operation unit 108 to display a wireless connection screen indicating the fixed SSID (e.g., the wireless connection screen 220), and the operation unit 108 displays the wireless connection screen. The fixed SSID is an SSID input by the user into the input area 602 in the setting screen 600.

In step S802, the CPU 101 determines whether the wireless connection using the access point mode has been established between the external apparatus and the printing apparatus 100. If the wireless connection using the access point mode has been established between the external apparatus and the printing apparatus 100 (YES in step S802), the processing proceeds to step S805. If the wireless connection using the access point mode has not been established between the external apparatus and the printing apparatus 100 (NO in step S802), the processing proceeds to step S803.

In step S803, the CPU 101 determines whether the stop button 222 for issuing the instruction to stop the operation in the access point mode has been pressed. If the user has touched the stop button 222 on the wireless connection screen 220, the CPU 101 determines that the stop button 222 has been pressed (YES in step S803), and the processing proceeds to step S804. If the user has not touched the stop button 222, the CPU 101 determines that the stop button 222 has not been pressed (No in step S803), and the processing returns to step S802.

In step S804, the CPU 101 stops the operation in the access point mode. More specifically, the CPU 101 instructs the wireless LAN I/F 105 to stop the operation in the access point mode.

In step S805, the CPU 101 determines whether the wireless connection using the access point mode has been interrupted. If the wireless connection using the access point mode has been interrupted (YES in step S805), the processing returns to step S802. If the wireless connection using the access point mode has not been interrupted (NO in step S805), the processing proceeds to step S806. In another exemplary embodiment, a plurality of wireless connections using the access point mode can be established in parallel. If the plurality of wireless connections is established in parallel, when all of the plurality of wireless connections has been interrupted, it is determined that the plurality of wireless connections using the access point mode has been interrupted (YES in step S805). Further, when the SSID to be used is set to the fixed SSID, even if the wireless connection using the access point mode is interrupted, the operation in the access point mode is not automatically stopped.

In step S806, the CPU 101 determines whether the stop button 222 for issuing the instruction to stop the operation in the access point mode has been pressed. If the user has touched the stop button 222 on the wireless connection screen 220, the CPU 101 determines that the stop button 222 has been pressed (YES in step S806), and the processing proceeds to step S804. In step S804, the CPU 101 stops the operation in the access point mode. If the user has not touched the stop button 222, the CPU 101 determines that the stop button 222 has not been pressed (NO in step S806), and the processing returns to step S805.

As described above, in the present exemplary embodiment, if the wireless connection using the access point mode has not been established since the operation in the access point mode was started, it is determined whether the operation in the access point mode is automatically stopped based on the type of the SSID.

If the SSID to be used in the access point mode is the one-time SSID, the printing apparatus 100 automatically stops the operation in the access point mode on the condition that the wireless connection has not been established for a predetermined period of time since the operation in the access point mode was started. The one-time SSID is assumed to be used for the purpose of temporarily using the access point mode and the printing apparatus 100.

If the SSID to be used in the access point mode is the fixed SSID, the printing apparatus 100 does not automatically stop the operation in the access point mode even if the wireless connection has not been established for a predetermined period of time since the operation in the access point mode was started. The fixed SSID is assumed to be used for the purpose of using the access point mode in an infrastructure connection by many and/or unspecified persons, like in an office environment. This type of environment lends itself more to the operation in the access point mode not automatically stopping, but continuing.

The printing apparatus 100 stops the operation in the access point mode when it receives a stop instruction from the user (when the stop button 220 has been pressed) regardless of whether the SSID to be used in the access point mode is the one-time SSID or the fixed SSID.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

What is claimed is:

1. A method for controlling a printing apparatus capable of establishing a direct wireless connection with a communication terminal, not through an intermediary of a relay apparatus, by operating as an access point conforming to an IEEE802.11 standard, comprising:
   starting an operation as the access point;
   stopping the operation as the access point in a case where a one-time SSID is used, on a condition that the direct wireless connection with the communication terminal is not established for a predetermined time period, and;
   continuing the operation as the access point in a case where a fixed SSID is used, even if the direct wireless connection with the communication terminal is not established for the predetermined time period.

2. The method according to claim 1,
   wherein the operation as the access point is started on a condition that an instruction to start the direct wireless connection is received from a user.

3. The method according to claim 2,
   wherein the operation as the access point is stopped on a condition that an instruction to stop the direct wireless connection is received from the user, in either case where the one-time SSID is used or where the fixed SSID is used.

4. The method according to claim 1,
   wherein the operation as the access point is stopped in a case where the one-time SSID is used, on a condition that an established direct wireless connection is disconnected, and
   wherein the operation as the access point is continued in a case where the fixed SSID is used, even if the established direct wireless connection is disconnected.

5. The method according to claim 1,
   wherein the operation as the access point is stopped in a case where the one-time SSID is used, on a condition that all of a plurality of established direct wireless connections are disconnected, and
   wherein the operation as the access point is continued in a case where the fixed SSID is used, even if the all of the plurality of established direct wireless connections are disconnected.

6. The method according to claim 1, further comprising:
   storing setting as to whether to use the one-time SSID or to use the fixed SSID; and
   operating as the access point in accordance with the stored setting.

7. The method according to claim 6, further comprising:
   displaying the one-time SSID or the fixed SSID in accordance with the stored setting.

8. The method according to claim 7, further comprising:
   displaying an encryption key together with the one-time SSID or the fixed SSID.

9. The method according to claim 6, further comprising:
   receiving the setting as to whether to use the one-time SSID or to use the fixed SSID based on a user operation,
   wherein the setting as to whether to use the one-time SSID or to use the fixed SSID is stored based on reception of the user operation.

10. The method according to claim 1, further comprising:
    generating the one-time SSID.

11. A printing apparatus capable of establishing a direct wireless connection with a communication terminal, not through an intermediary of a relay apparatus, by operating as an access point conforming to an IEEE802.11 standard, comprising:
    a memory storing instructions; and
    at least one processor that executes the instructions to cause the printing apparatus to: start an operation as the access point;
    stop the operation as the access point in a case where a one-time SSID is used, on a condition that the direct wireless connection with the communication terminal is not established for a predetermined time period, and;
    continue the operation as the access point in a case where a fixed SSID is used, even if the direct wireless connection with the communication terminal is not established for the predetermined time period.

12. The printing apparatus according to claim 11,
    wherein the operation as the access point is started on a condition that an instruction to start the direct wireless connection is received from a user.

13. The printing apparatus according to claim 12,
    wherein the operation as the access point is stopped on a condition that an instruction to stop the direct wireless connection is received from the user, in either case where the one-time SSID is used or where the fixed SSID is used.

14. The printing apparatus according to claim 11,
    wherein the operation as the access point is stopped in a case where the one-time SSID is used, on a condition that an established direct wireless connection is disconnected, and
    wherein the operation as the access point is continued in a case where the fixed SSID is used, even if the established direct wireless connection is disconnected.

15. The printing apparatus according to claim 11,
    wherein the operation as the access point is stopped in a case where the one-time SSID is used, on a condition that all of a plurality of established direct wireless connections are disconnected, and
    wherein the operation as the access point is continued in a case where the fixed SSID is used, even if the all of the plurality of established direct wireless connections are disconnected.

16. The printing apparatus according to claim 11, wherein execution of the instructions by the at least on processor further causes the printing apparatus to:
    store a setting as to whether to use the one-time SSID or to use the fixed SSID; and
    operate as the access point in accordance with the stored setting.

17. The printing apparatus according to claim 16, wherein execution of the instructions by the at least on processor further causes the printing apparatus to:
  cause display of the one-time SSID or the fixed SSID in accordance with the stored setting.

18. The printing apparatus according to claim 17, execution of the instructions by the at least on processor further causes the printing apparatus to:
  cause display of an encryption key together with the one-time SSID or the fixed SSID.

19. The printing apparatus according to claim 11, execution of the instructions by the at least on processor further causes the printing apparatus to:
  generate the one-time SSID.

20. A non-transitory computer readable storage medium storing instructions that, when executed by at least one processor, executions a method for controlling a printing apparatus capable of establishing a direct wireless connection with a communication terminal, not through an intermediary of a relay apparatus, by operating as an access point conforming to an IEEE802.11 standard, the method comprising:
  starting an operation as the access point;
  stopping the operation as the access point in a case where a one-time SSID is used, on a condition that the direct wireless connection with the communication terminal is not established for a predetermined time period, and;
  continuing the operation as the access point in a case where a fixed SSID is used, even if the direct wireless connection with the communication terminal is not established for the predetermined time period.

* * * * *